May 17, 1960     L. G. ALLEN ET AL     2,936,855
PLEATED FILTER AND MECHANISM FOR FORMING SAME
Filed Oct. 23, 1957     2 Sheets-Sheet 1
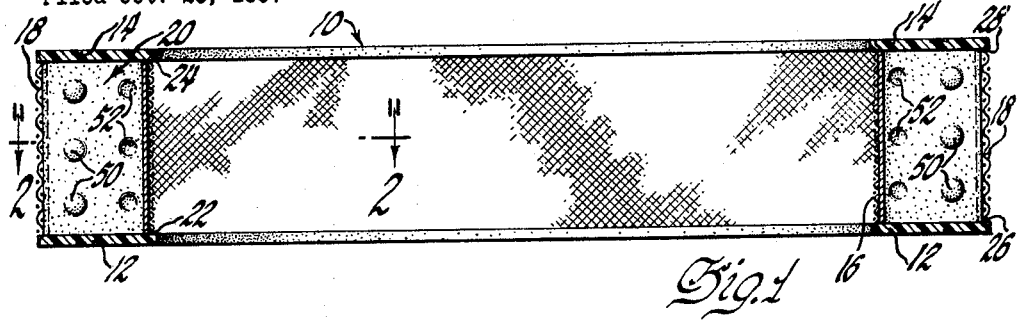
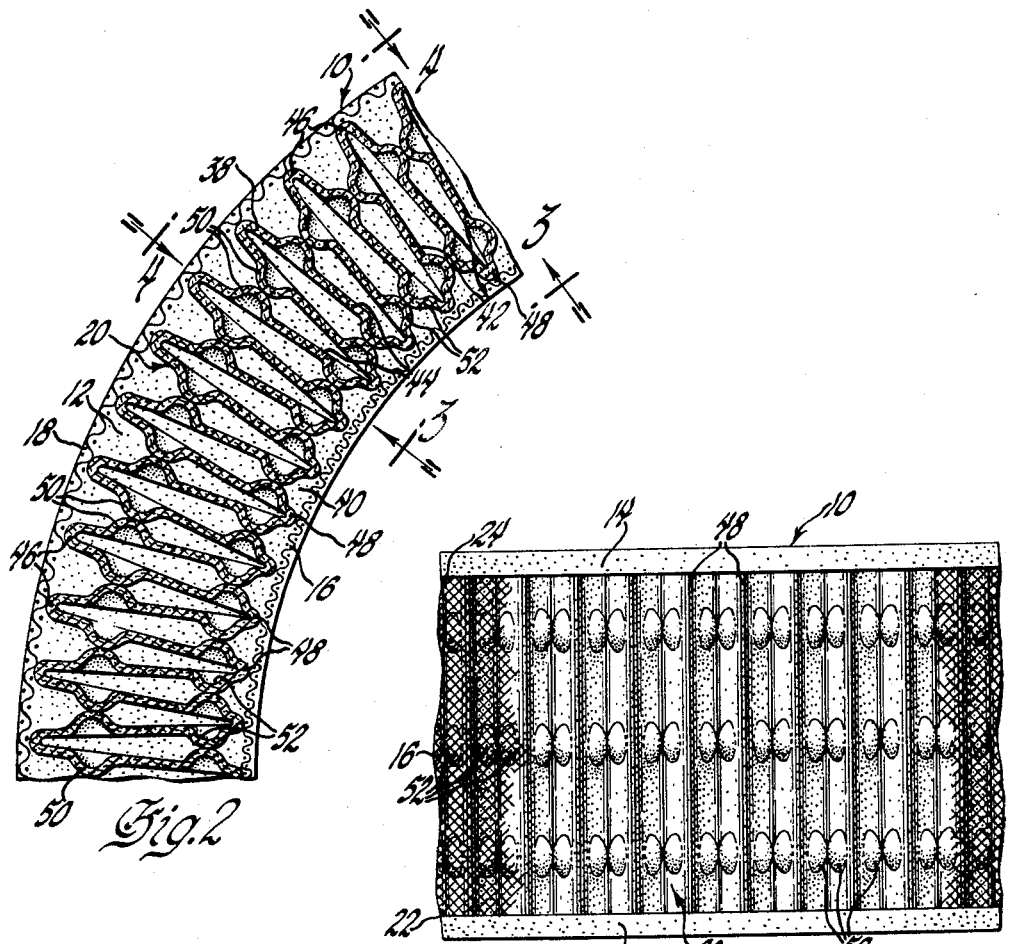
INVENTORS
Lloyd G. Allen &
Donald A. McMillan
BY
L. D. Busch
ATTORNEY May 17, 1960     L. G. ALLEN ET AL     2,936,855
PLEATED FILTER AND MECHANISM FOR FORMING SAME
Filed Oct. 23, 1957     2 Sheets-Sheet 2

INVENTORS
Lloyd G. Allen, &
Donald A. McMillan
by L. D. Burch
ATTORNEY

United States Patent Office 2,936,855
Patented May 17, 1960

2,936,855
PLEATED FILTER AND MECHANISM FOR FORMING SAME

Lloyd G. Allen and Donald A. McMillan, Saginaw, Mich., assignors to General Motors Corporation, Detroit, Mich., a corporation of Delaware Application October 23, 1957, Serial No. 691,992

2 Claims. (Cl. 183—71)

The invention relates to a filter unit for filtering fluids and the mechanism for forming the filter element. The filter unit is particularly adapted for use as an air filter with internal combustion engines. Air filters which may be of the disposable type have been commercially produced for several years. One such type filter uses pleated filter elements disposed between a pair of end walls to filter the air entering the engine. When such elements have been used, the problem of spacing the pleats has contributed to increased labor costs since the pleats must be manually positioned with approximately equal spacing throughout the filter circumference. In many instances several pleats would be left inadvertently close together and full filter capacity would not be realized. It is now proposed to provide means for spacing each pleat of a filter element at a predetermined distance relative to the adjacent pleat without the necessity of manually positioning the pleats during installation of the element in the end walls. The invention also provides for the proper radius of curvature of the pleated element when installed to provide an annular filter unit. These results are gained by forming bumps or dimples on the pleats in oppositely disposed relationship so that adjacent bumps on adjacent pleats engage each other. A greater radius of curvature of the pleat fold at its outer edge as compared to the radius of curvature of the pleat fold at the inner edge as utilized to provide the approximate overall radius of curvature desired.

In the drawings:

Fig. 1 illustrates a filter unit having a pleated filter embodying the invention, with parts in section;

Fig. 2 is a cross section view of a portion of the filter unit of Fig. 1 and is taken in the direction of arrows 2—2 on that figure;

Fig. 3 is an elevational view having parts broken away and taken in the direction of arrows 3—3 of Fig. 2;

Figure 4:
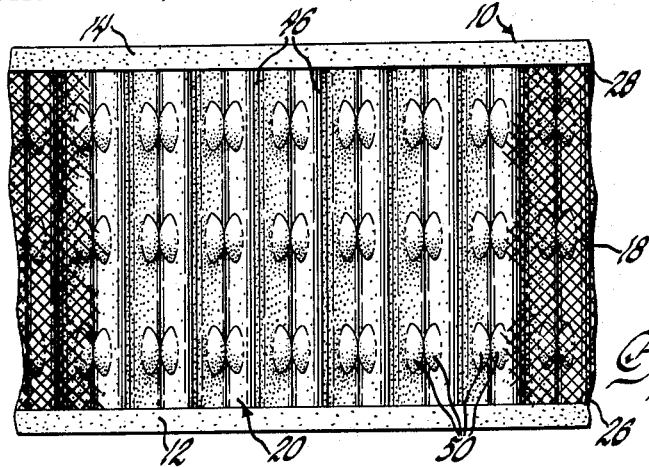
Fig. 4 is an elevational view having parts broken away and taken in the direction of arrows 4—4 of Fig. 2.

The filter unit 10 embodying the invention may be of the disposable type and is illustrated in the drawings as an air filter unit such as those used to filter the intake air of an internal combustion engine. The unit is comprised of a pair of spaced annular end walls or supports 12 and 14, inner and outer walls of wire screens 16 and 18, and a pleated filter element 20. The ends 22, 24, 26 and 28 of screens 16 and 18 may be embedded in the end walls 12 and 14 to anchor the screens securely.

Figure 5:
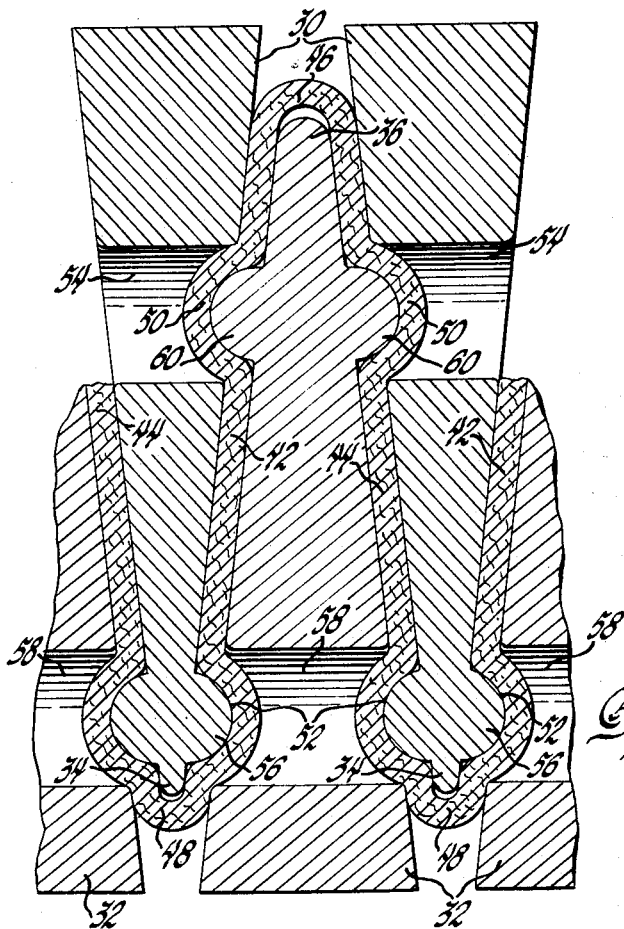
Fig. 5 is an enlarged cross section view of the filter element during process of manufacture and including mechanism for forming the filter element.

The filter element 20 is formed from a strip of suitable filter material by means of intermeshing folding paddles 30 and 32. The strip of filter material being folded and formed is received intermediate the meshed paddles. The strip assumes the contour of the paddles and is pleated to form the desired configuration. This is best seen in Figure 5. The paddles 30 are generally wedge shaped in cross section and terminate with a relatively small radius of curvature at their outer ends 34. The paddles 32 are also generally wedge shaped in cross section. They may terminate in a somewhat larger radius of curvature at their outer ends 36. The filter element 20 is thus formed to have one side of the pleated strip provided with folds having a larger radius of curvature than the other side. The side with the larger radius of curvature becomes the outer periphery 38 of the filter element 20 when it is installed as part of annular filter unit 10. The inner periphery 40 of the filter element includes the folds having the smaller radius of curvature. The difference in radii of curvature causes the element 20, when placed in position intermediate screens 16 and 18, to assume the proper radius of curvature for the annular unit of which it becomes a part. It may also be desirable to have the folds formed with the same radii of curvature for certain applications such as planar filters, or to have the smaller radius fold on the outer curve and the larger radius fold of the inner curve of a curved filter.

Each pleat includes two sides 42 and 44 interconnected by an outer periphery fold 46 and connected to the sides of adjacent pleats by inner periphery folds 48. Each of the pleat sides 42 and 44 is deformed to provide one or more bumps 50 adjacent the outer fold 46. Three such bumps are shown on the filter element illustrated. The bumps may be spherically formed or have other desirable configurations. They may be in rows or otherwise spaced. Each pleat side may also be provided with one or more dimples 52 adjacent the inner fold 48. The dimples 52 ar similar to the bumps 50, but are depressed inwardly of the pleat. This construction permits adjacent bumps 50 to engage each other and maintain a constant spacing between adjacent pleat sides. The inner sides of dimples 52 also constitute bumps which similarly engage each other to maintain a constant spacing between adjacent pleat sides at the inner periphery of the filter element. While it is preferable to provide bumps 50 and dimples 52, a filter element may be made with only one type of such deformation to obtain some advantages inherent in the invention.

Paddles 30 are provided with passages 54 and protuberances 56. Paddles 32 are similarly provided with passages 58 and protuberances 60. The passages 54 and protuberances 60 are aligned when paddles 30 and 32 are fully meshed. Protuberances 60 thus force portions of the filter element 20 into passages 54 to form bumps 50. Protuberances 56 and passages 58 are similarly aligned to form dimples 52.

As is readily seen in Fig. 2, each of the pleats of the filter element 20 are equally spaced when assembled to form a filter unit. This results in an increase in filtering capacity as compared to filters having unequal spacing. All of the pleat sides are exposed to air passing through the filter and full advantage is taken of the entire area of the filter element. The use of the maximum area determines filter capacity to a great extent since the particles being filtered are held in the filter body. If any surfaces of the filter element 20 are unexposed or only partially exposed to incoming air, the portion of the element adjacent these surfaces is not permitted to absorb foreign matter to its full capacity before other portions of the filter have become so clogged that the filter must be replaced. By providing equal spacing between the pleats a closer pleat spacing may also be used, thus allowing additional filter material to be incorporated in a filter element without changing its overall dimensions. This additional material provides greater filtering capacity not realized by prior elements.

Filter units are usually built up by placing the filter element between the supporting screens and on the lower end wall. When filter elements without spacing bumps or dimples are used, an operator must adjust the element pleats until an acceptable spacing is obtained. When a filter element embodying the invention is used, the pleats are self spacing and no individual attention need be given at this point.

What is claimed is:

1. An annular filter unit comprising, parallel spaced annular end walls, an inner peripheral screen and an outer peripheral screen connecting said end walls to form an annular chamber, and a pleated annular filter element mounted in said chamber, said filter element having radially extending pleats in evenly spaced relation, said pleats each comprising two sides and an arcuate interconnecting fold and being interconnected with one side of each adjacent pleat by an arcuate connecting fold, a series of outwardly extending bumps being formed outwardly from said sides adjacent said interconnecting folds, said bumps providing the only common contact points between adjacent pleats, said interconnecting folds having a larger radius of curvature than said connecting folds.

2. An annular filter unit comprising, parallel spaced annular end walls, an inner peripheral screen and an outer peripheral screen connecting said end walls to form an annular chamber, and a pleated annular filter element mounted in said chamber, said filter element having radially extending pleats in evenly spaced relation, said pleats each comprising two sides and an arcuate interconnecting fold and being interconnected with one side of each adjacent pleat by an arcuate connecting fold, a series of outwardly extending bumps being formed outwardly from said sides adjacent said interconnecting folds, said bumps providing the only common contact points between adjacent pleats, said pleat sides having a series of inwardly disposed dimples forming inwardly projecting bumps, said inwardly projecting bumps providing the only common contact points between the two sides of each of said pleats, said interconnecting folds having a larger radius of curvature than said connecting folds.

References Cited in the file of this patent

UNITED STATES PATENTS

| | | |
|---|---|---|
| 1,967,726 | Sherman | July 24, 1934 |
| 2,290,608 | Evans | July 21, 1942 |
| 2,771,156 | Kasten et al. | Nov. 20, 1956 |
| 2,824,622 | Buckman | Feb. 25, 1958 |
| 2,836,302 | Buckman | May 27, 1958 |

FOREIGN PATENTS

| | | |
|---|---|---|
| 745,466 | France | Feb. 21, 1933 |
| 817,369 | France | Feb. 4, 1937 |
| 1,111,568 | France | Nov. 2, 1955 |
| 295,379 | Switzerland | Dec. 31, 1953 |